(12) United States Patent
Horiuchi et al.

(10) Patent No.: US 7,789,416 B2
(45) Date of Patent: Sep. 7, 2010

(54) AIR BAG MODULE COVER STRUCTURE (75) Inventors: Tadanori Horiuchi, Wako (JP); Takeshi Kuroe, Wako (JP); Satoshi Iijima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 306 days.

(21) Appl. No.: 11/530,241

(22) Filed: Sep. 8, 2006

(65) Prior Publication Data
US 2007/0057488 A1 Mar. 15, 2007

Related U.S. Application Data (60) Provisional application No. 60/715,143, filed on Sep. 9, 2005.

(51) Int. Cl.
*B60R 21/215* (2006.01)
(52) U.S. Cl. .................................. 280/728.3
(58) Field of Classification Search .............. 280/728.3, 280/730.1, 728.2, 732, 733, 730.2, 735, 743.2
See application file for complete search history.

(56) References Cited

U.S. PATENT DOCUMENTS

| 4,299,406 | A | * | 11/1981 | Thomas | 280/733 |
| 5,306,042 | A | * | 4/1994 | Frank | 280/728.3 |
| 5,556,126 | A | * | 9/1996 | Lee | 280/728.3 |
| 5,904,367 | A | * | 5/1999 | Warnez et al. | 280/728.3 |
| 6,007,090 | A | * | 12/1999 | Hosono et al. | 280/730.2 |
| 6,099,027 | A | * | 8/2000 | Shirk et al. | 280/728.3 |
| 6,113,133 | A | * | 9/2000 | Iijima et al. | 280/730.1 |
| 6,186,535 | B1 | * | 2/2001 | Sugiyama et al. | 280/728.3 |
| 6,854,762 | B2 | * | 2/2005 | Yanagibashi et al. | 280/736 |
| 6,932,379 | B2 | * | 8/2005 | Yamazaki et al. | 280/730.1 |
| 7,168,732 | B2 | * | 1/2007 | Kuroe et al. | 280/730.1 |
| 7,255,363 | B2 | * | 8/2007 | Horiuchi | 280/728.3 |
| 7,275,762 | B2 | * | 10/2007 | Miyata | 280/743.2 |
| 7,293,793 | B2 | * | 11/2007 | Miyata | 280/730.1 |
| 7,354,060 | B2 | * | 4/2008 | Thomas | 280/728.3 |
| 2003/0222439 | A1 | * | 12/2003 | Akiyama et al. | 280/730.1 |
| 2003/0230886 | A1 | * | 12/2003 | Yamazaki et al. | 280/801.1 |
| 2004/0150197 | A1 | * | 8/2004 | Iijima et al. | 280/730.1 |
| 2004/0207189 | A1 | * | 10/2004 | Miyata | 280/743.2 |
| 2005/0023803 | A1 | | 2/2005 | Kuroe et al. | |
| 2005/0040628 | A1 | * | 2/2005 | Miyata | 280/730.1 |

(Continued)

FOREIGN PATENT DOCUMENTS

JP    3-73251 U    7/1991

(Continued)

OTHER PUBLICATIONS

European Search Report dated Sep. 25, 2006 issued in corresponding European Patent Application No. 06 01 6112.

*Primary Examiner*—Paul N Dickson
*Assistant Examiner*—Karen Jane J Amores
(74) *Attorney, Agent, or Firm*—Westerman, Hattori, Daniels & Adrian, LLP (57) ABSTRACT

An air bag module cover structure is applied to a substantially rectangular parallelepiped-shaped air bag module. The three side surfaces of the air bag module that do not face the vehicle front side are provided with tear lines at upper portions thereof.

1 Claim, 6 Drawing Sheets

U.S. PATENT DOCUMENTS

| | | | |
|---|---|---|---|
| 2006/0022440 A1* | 2/2006 | Umehara | 280/730.1 |
| 2007/0024034 A1* | 2/2007 | Thomas | 280/731 |
| 2007/0040359 A1* | 2/2007 | Chen et al. | 280/728.3 |
| 2007/0045995 A1* | 3/2007 | Adler et al. | 280/728.3 |
| 2007/0052215 A1* | 3/2007 | Miyata | 280/730.1 |
| 2007/0052216 A1* | 3/2007 | Miyata | 280/730.1 |
| 2007/0052217 A1* | 3/2007 | Miyata | 280/730.1 |
| 2007/0052218 A1* | 3/2007 | Miyata | 280/730.1 |

FOREIGN PATENT DOCUMENTS

| | | |
|---|---|---|
| JP | 06-344842 A | 12/1994 |
| JP | 7-291072 A | 11/1995 |
| JP | 8-164814 A | 6/1996 |
| JP | 2003-212075 A | 7/2003 |
| JP | 2004-314811 A | 11/2004 |
| JP | 2005-162033 A | 6/2005 |
| JP | 2007-069782 A | 3/2007 |

* cited by examiner

AIR BAG MODULE COVER STRUCTURE

This application claims benefit of earlier filed U.S. Provisional Application No. 60/715,143 filed on Sep. 9, 2005.

FIELD OF INVENTION

The present invention relates to an air bag module cover structure, particularly to an air bag module cover structure suited for use with a motorcycle.

BACKGROUND OF THE INVENTION

In general, the application of an air bag for restraining a rider in the event that an impact greater in level than a predetermined value is applied to a vehicle body of a motorcycle is known.

For example, it has been known to provide a vehicle with a substantially rectangular-shaped air bag module integrally containing therein a folded air bag and an inflator for inflating and developing the air bag and the like having a configuration in which the surface(s) of an air bag module cover as a predetermined development surface(s) is provided with a tear line as a brittle portion. Accordingly, at the time of inflation and development of the air bag, the pressure inside the air bag is raised by a gas generated from the inflator, whereby the tear line is ruptured and the air bag is developed. The tear line is required to have such a brittleness as to be appropriately ruptured at the time of inflation and development of the air bag and, simultaneously, to have such an appropriate strength as not to be deformed or ruptured when touched by the rider (passenger) or the like.

For example, Japanese Patent Laid-open No. 2005-162033 discloses such a configuration of an air bag module cover for application to a passenger seat air bag system in a four-wheel vehicle, wherein a tear line formed across a development surface(s) is in the shape of a single arc. According to this air bag module cover, even when the tear line and the surrounding portion are pushed by the passenger or the like, the pushing force is dispersed to the arc-shaped peripheral portions, so that the tear line and the surrounding portion are enhanced in rigidity and are less liable to be depressed. Also, both end portions of the first tear line are orthogonally intersecting with rectilinear second tear lines, so that, at the time of inflation and development of the air bag, the force exerted on the tear line is transmitted evenly, and smooth development of the air bag is realized.

Also, Japanese Patent Laid-open No. 2003-212075 discloses an example of a tear line structure formed in an air bag module cover for a four-wheel vehicle air bag system. In this tear line structure, an anti-leaking member provided for preventing a foamable resin of a foamable resin layer from flowing from a development portion into the air bag side, at the time of forming a perforation having a predetermined depth from the back side of the air bag module cover by laser processing, is removed only at the portion on the tear line, so that non-evenness of rupture of the tear line due to the anti-leaking member is obviated, and smooth development of the air bag is realized.

SUMMARY OF THE INVENTION

In general, when the air bag module described above is installed on a motorcycle, the surface of the air bag module cover which is provided with a tear line is necessarily placed in an outdoor environment (e.g., exposed to the elements of nature), which is different from the compartment environment in the case of a four-wheel vehicle. Accordingly, the tear line is not only put under influences of direct sunlight, winds, and rains but it is also likely to be touched by the rider's hand (e.g. when the rider gets on or off the motorcycle.) If the tear line should be damaged due to such environmental factors and human behaviors, then the damage may adversely affect the inflating and developing action of the air bag.

The technologies disclosed in Japanese Patent Laid-open No. 2005-162033 and Japanese Patent Laid-open No. 2003-212075 are both presumed to be applied in the compartment of a four-wheel vehicle, and the references do not contain any suggestion or consideration as to the problems in applying the air bag module to a motorcycle as above-mentioned. It is an object of the present invention to solve the above-mentioned problems involved in the conventional art, and to provide an air bag module cover structure suited for use with a motorcycle.

According to one aspect of the present invention an air bag module cover structure is applied to a substantially rectangular parallelepiped-shaped air bag module (e.g. four-sided). Three side surfaces other than the side surface facing to the vehicle front side are provided, for example, with tear lines at upper portions thereof. Accordingly, an air bag module cover structure with enhanced toughness of the surface of the module cover against external factors, which is suited for application with a motorcycle, can be obtained. Moreover, for example, even if a sticker is attached to the surface of the module cover or the surface is scratched, the inflation and development of the air bag will not thereby be influenced in any way. Further, the degree of freedom in designing the module cover surface can be enhanced.

According to another aspect of the present invention, the air bag module cover is developed toward the vehicle front side through rupture of the tear lines, and a stopper is provided on the vehicle front side of the air bag module cover. Accordingly, the air bag module cover can be developed to a predetermined angle.

According to another aspect of the present invention, the side surface facing the vehicle rear side of the air bag module is provided with a slit portion through which to pass a support belt connecting an air bag and a vehicle body to each other. The tear lines are provided respectively in the side surface facing to the vehicle rear side excluding the slit portion and in both the side surfaces facing in the vehicle width direction. Accordingly, the strength of the air bag module cover structure is increased.

BRIEF DESCRIPTION OF THE DRAWINGS

A preferred embodiment of the present invention will be described with reference to the accompanying drawings, wherein:

FIGS. 5(*a*) and 5(*b*) show a front view and a side view of an air bag module to which an air bag module cover structure according to one embodiment of the present invention is applied.

DETAILED DESCRIPTION OF THE INVENTION

Embodiments of the present invention will be described with reference to the accompanying drawings.

Figure 1:
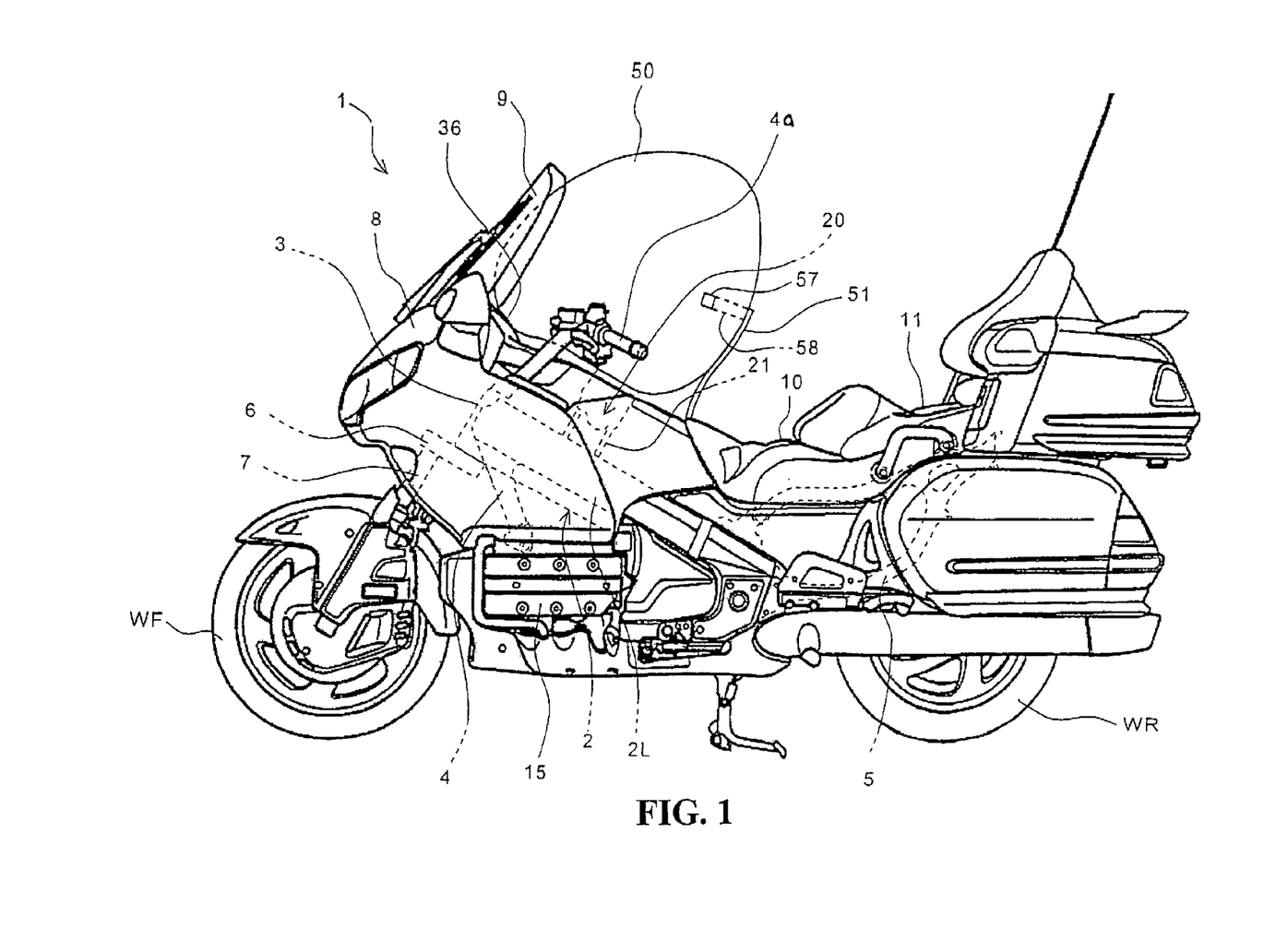
FIG. 1 is a general illustration of a motorcycle according to one embodiment of the present invention.

FIG. 1 is a general illustration of a motorcycle 1 according to one embodiment of the present invention. A frame 2 of the motorcycle 1 is essentially made of a left-right pair of upper tubes 2L and 2R (not shown) extending downwards toward the vehicle body rear side from a head pipe 3. Lower tubes 4 extend downwards from portions, in the vicinity of the head pipe 3, of the upper tubes 2L and 2R, and a drive source, e.g., engine 15, is fixedly suspended from the tip ends of the lower tubes 4. A left-right pair of front forks 7 steerable by a steering handle 4a are turnably supported on the head pipe 3 through lower brackets 6, and a front wheel WF is rotatably supported on lower end portions of the front forks 7. In addition, a seat frame 5 for supporting a main seat 10, a rear seat 11, and the like is connected to the vehicle body rear side of the frame 2, and a rear wheel WR as a drive wheel is rotatably supported on a rear end portion of a swing arm (not shown) swingably connected to the frame 2.

The motorcycle 1 according to this embodiment is provided with an air bag 50 which, when an excessive shock is exerted on the vehicle body, is inflated and developed into a roughly spherical body so sized as to range from the upper side of the main seat 10 into the vicinity of a windscreen 9, which is provided at an upper end portion of an upper cowl 8, and to make contact with a meter case 36. An air bag module 20 integrally containing the air bag 50 and an inflator (not shown) for generating a gas for inflating and developing the air bag 50 is fixed to the upper tubes 2L and 2R by a support stay 21 at a position on the vehicle body front side relative to the seating position of the rider. Incidentally, support belts 51 connected to rear portions of the air bag 50 are for keeping the air bag 50 in an appropriate position at the time of restraining the rider.

Figure 2:
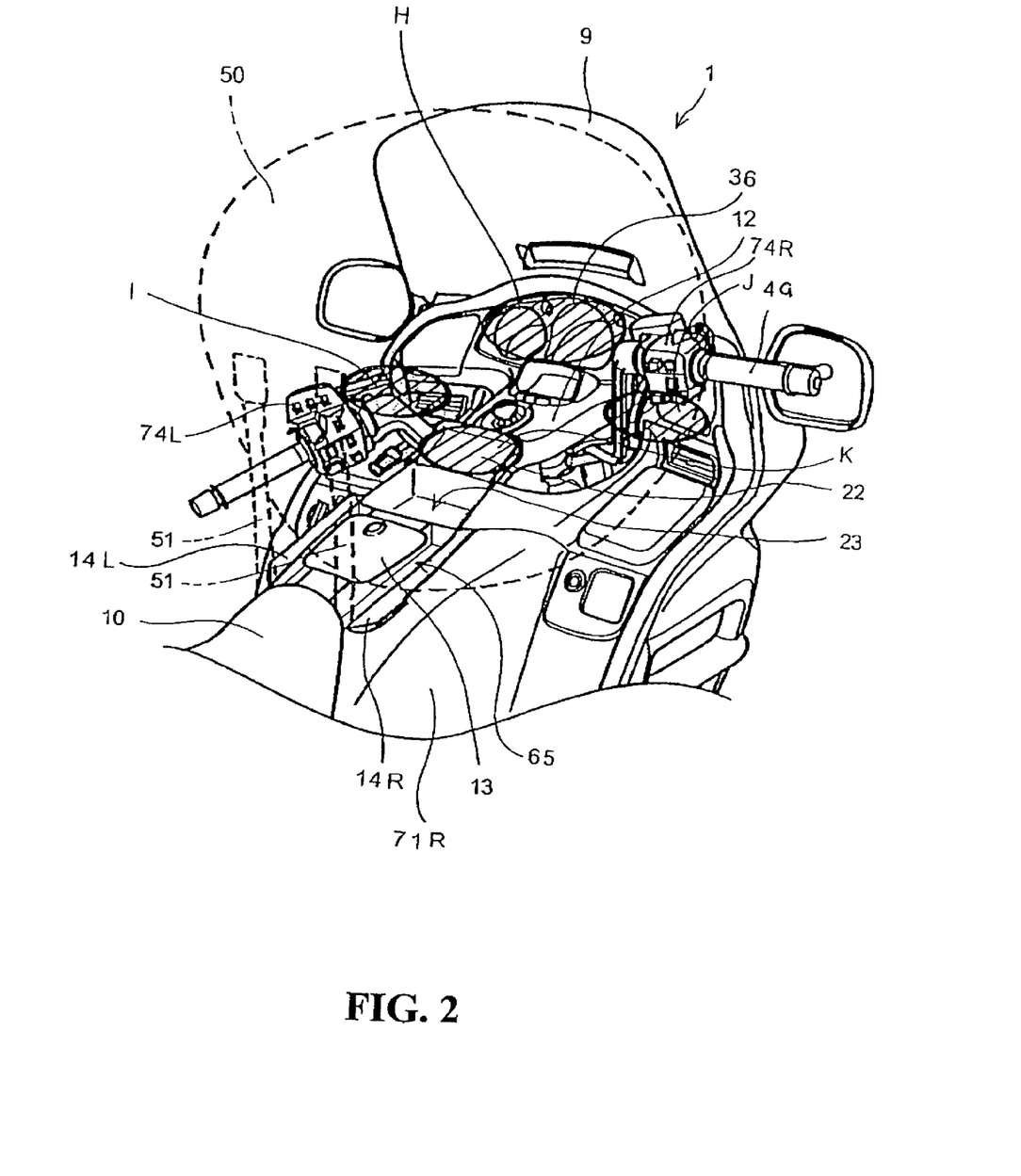
FIG. 2 is an enlarged view of a motorcycle according to one embodiment of the present invention.

FIG. 2 is an enlarged view of a part of the motorcycle 1 according to one embodiment of the present invention. The same symbols as used above denote portions which are the same as or equivalent to the above-mentioned. The air bag module 20 (see FIG. 1) has a configuration in which the inflator and the air bag 50 in its folded state are provided in a box-shaped casing 23, and an upper portion thereof is covered with a module cover 22. The air bag module is disposed between an ignition cover 12 covering the upper side of a top bridge (not shown) connecting the steering handle 4a and the front forks 7 to each other and an oil feed port lid 13 located on the upper side of a fuel tank (not shown). At the time of inflation and development of the air bag 50, the gas generated by the inflator is instantaneously supplied into the air bag 50 inside the casing 23, and the pressure of the gas opens the module cover 22, with one side on the vehicle front side as an axis. An air bag module cover structure according to the present invention is applied to a tear line provided as a brittle portion between the module cover 22 and the casing 23.

In addition, the support belt 51 contained in a folded state in a containing space 65 under belt covers 14L and 14R at normal time is configured such that, upon inflation and development of the air bag 50, the support belts 51 are developed to the positions indicated by broken lines in the figure while forcibly opening the belt covers 14L and 14R to the left and right sides.

The steering handle 4a is steered to the left side in the figure, but at the time of inflation and development of the air bag 50, a front lower portion of the air bag 50 is stably supported by four portions, e.g., portion I in the vicinity of a left-side switch portion 74L, portion J in the vicinity of a right-side switch portion 74R in a neutral condition of the steering handle 4a, portion H by the meter case 36, and portion K by the module cover 22. Lower end portions of the support belts 51 are fastened to a vehicle body side member on the lower side of the main seat 10 located on the upper side of a top shelter 71R.

Figure 3:
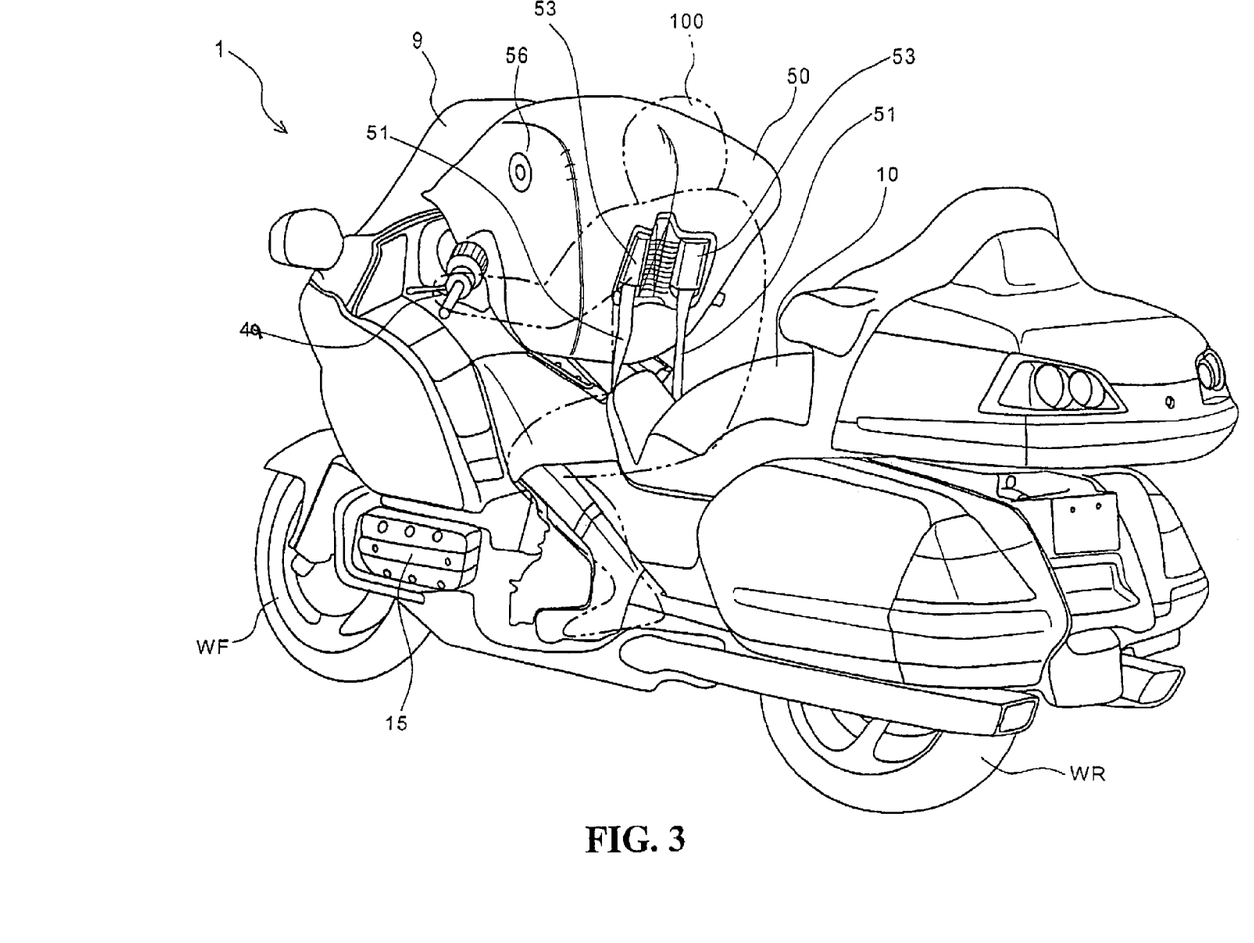
FIG. 3 is a perspective illustration of a motorcycle according to one embodiment of the present invention.

FIG. 3 is a perspective illustration of the motorcycle 1 at the time of inflation and development of the air bag 50. The air bag 50 is configured such that its surface on the rider's side becomes roughly V shaped upon inflation and development (e.g., for the purpose of effectively enveloping the rider.) Further, the air bag 50 is configured to be supported not only by the support belts 51 but also by the whole of members located at a front lower portion of the air bag 50 (e.g., the steering handle 4a, the ignition cover 12, the meter cover 36, etc.) In addition, the air bag 50 is provided in left and right surfaces of an upper portion thereof with vent holes 56 (for example, φ45) for discharging the gas at an appropriate rate while restraining the rider.

Figure 4:
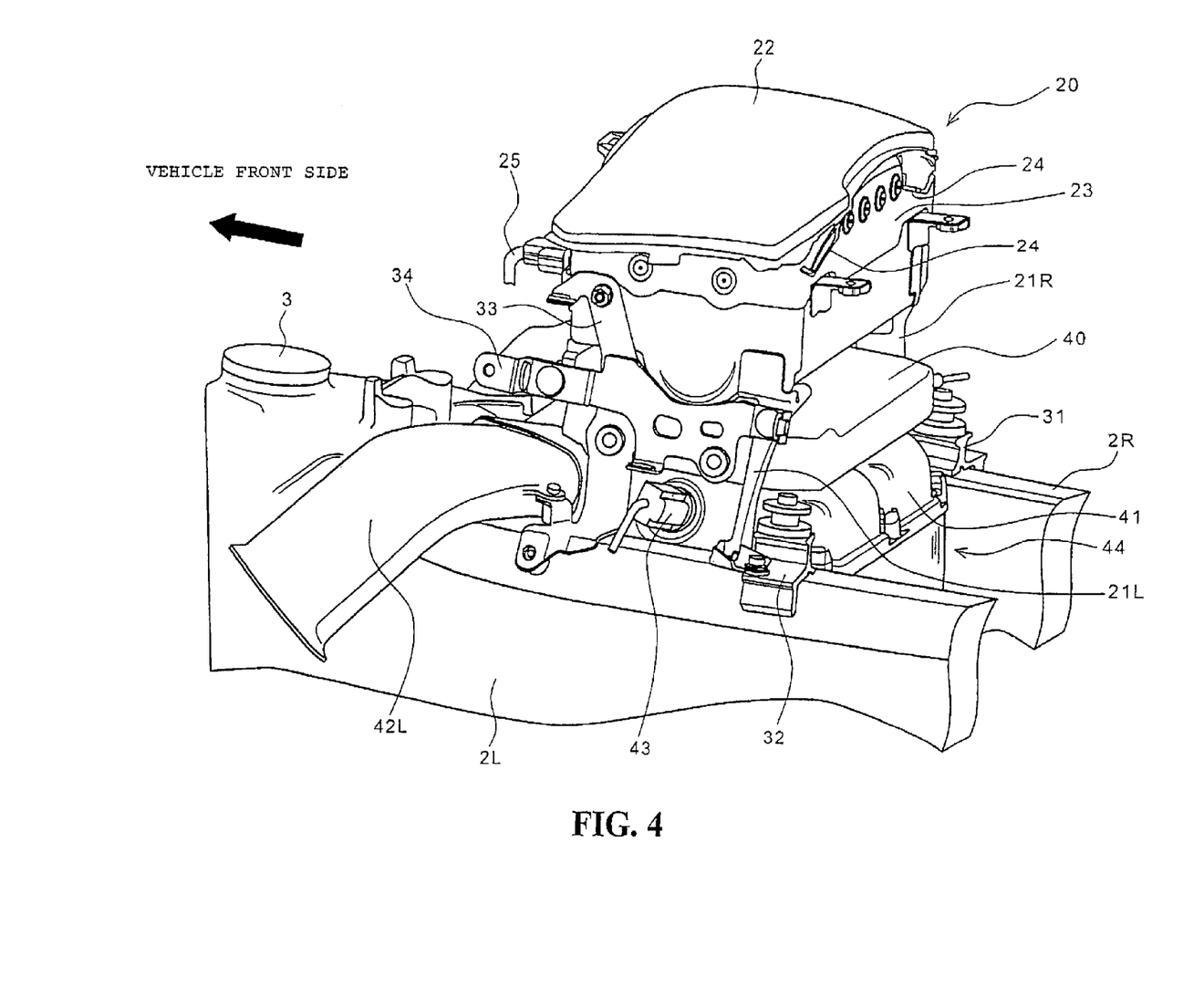
FIG. 4 is a perspective view illustrating a mounting structure of an air bag module according to one embodiment of the present invention.

FIG. 4 is a perspective view illustrating a mounting structure of the air bag module 20. The same symbols as used above denote portions the same with or equivalent to the above-mentioned. A left-side support stay 21L and a right-side support stay 21R are attached (e.g., fused) to lower portions of the casing 23 of the air bag module 20, and are fixed, for example, by predetermined bolts to support members 30 (not shown), 31, 32 which are attached (e.g. fused) to the upper tubes 2L and 2R. A connector 25 provided on a side surface on the vehicle front side of the casing 23 is for inputting an ignition signal to the inflator contained in the casing 23.

An air cleaner box 44 for filtering the outside air to be introduced into the engine 15 and an upper cover 41 thereof are so disposed as to be clamped between the upper tubes 2L and 2R, and a substantially rectangular parallelopiped-shaped audio unit 40 is arranged on the upper side thereof. In addition, an FI unit support stay 34 for fixing a fuel injection control (FI) unit and a left-side air duct 42L for introducing the outside air into the air cleaner box 44 from the vehicle front side are fixed to a third support stay 33 disposed between the casing 23 and the upper tube 2L. A connector 43 for outputting a signal from an intake air temperature sensor provided in the air cleaner box 44 is disposed at a side surface of the upper cover 41. A side surface on the rider's side of the casing 23 is provided with slits 24 as gaps for passing the support belts 51 therethrough.

According to the mounting structure of the air bag module 20 as above-described, the space generated on the lower side of the air bag module 20 for attaining an optimum layout of the air bag module 20 can be effectively utilized as a space for arranging other component parts, so that a reduction in the volume of the space for arranging the air bag module 20 is realized. In view of the mounting condition shown in the figure, by removing the FI unit support stay 34 and the third support stay 33, the audio unit 40 and the upper cover 41 are removed on the vehicle left side, without moving and removing the air bag module 20. Therefore, maintenance work such as replacement of an air filter (not shown) disposed in the air cleaner box 44 can be carried out easily.

Figure 5:
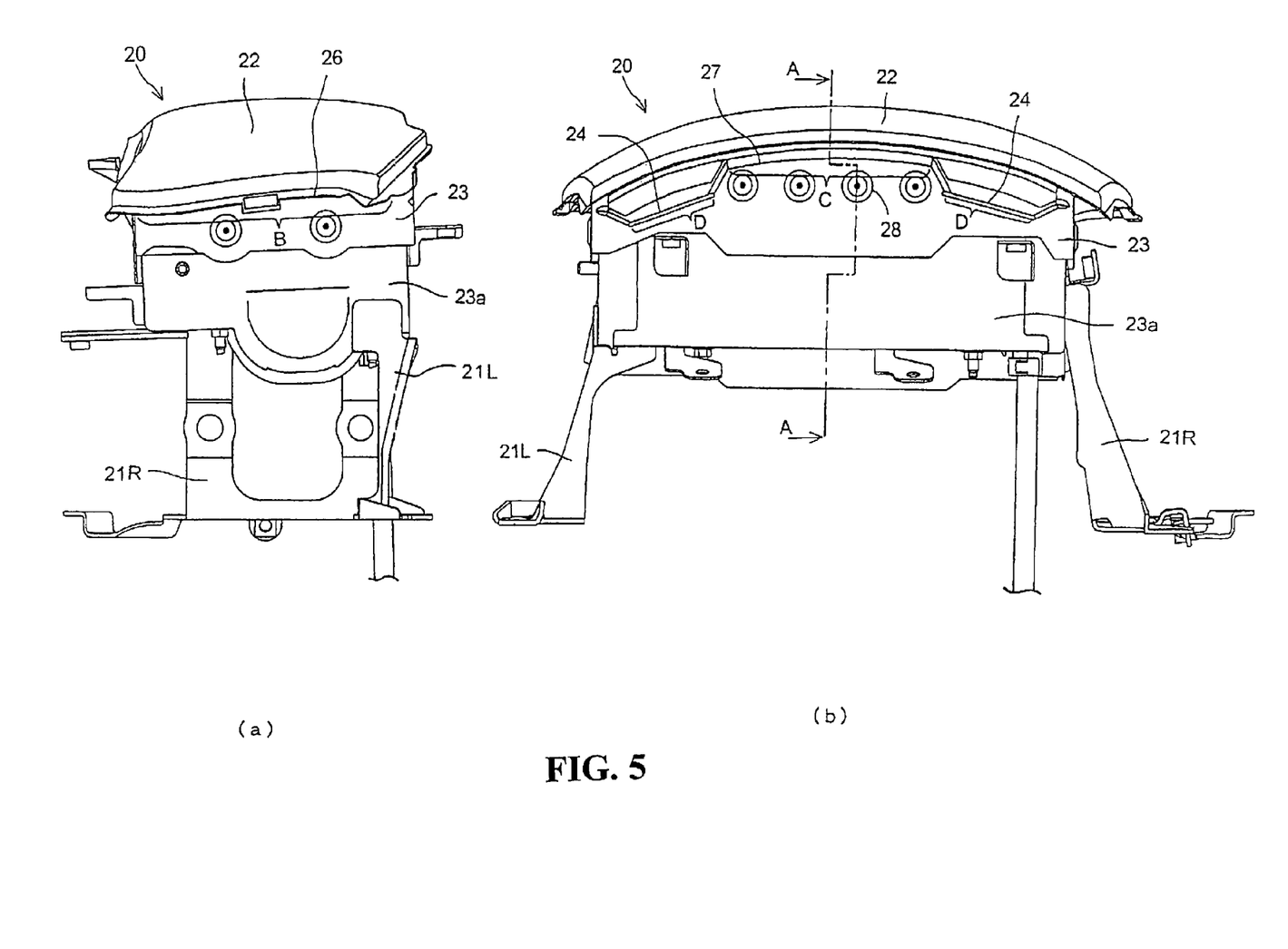

FIG. 5(a) is a side view of the air bag module 20, and FIG. 5(b) is a front view of the air bag module 20 as viewed from the rider's side. The same symbols as used above denote portions the same with or equivalent to the above-mentioned. The air bag module cover structure according to this embodiment is characterized in that tear lines as brittle portions are not provided in the surface of the module cover 22 but provided in side surfaces of an upper portion of the air bag module 20. In this embodiment, both side surfaces facing in the vehicle width direction are each provided with a first tear line 26 in portion B in the figure, and the front surface (facing to the vehicle rear side) as viewed from the rider's side is provided with a second tear line 27 in portion C in the figure other than portion D in the figure as the slit 24. Therefore, at the time of inflation and developing of the air bag 50, the substantially rectangular module cover 22 is developed in such a manner as to open a lid with one side on the vehicle front side as an axis, relative to the casing 23.

Incidentally, in this embodiment, the module cover 22 and the casing 23 are component parts which are integrally molded from a synthetic resin. A metallic lower-side casing 23a for containing the inflator and the like and the casing 23 are fastened to each other (e.g., by a plurality of clips 28.)

Figure 6:
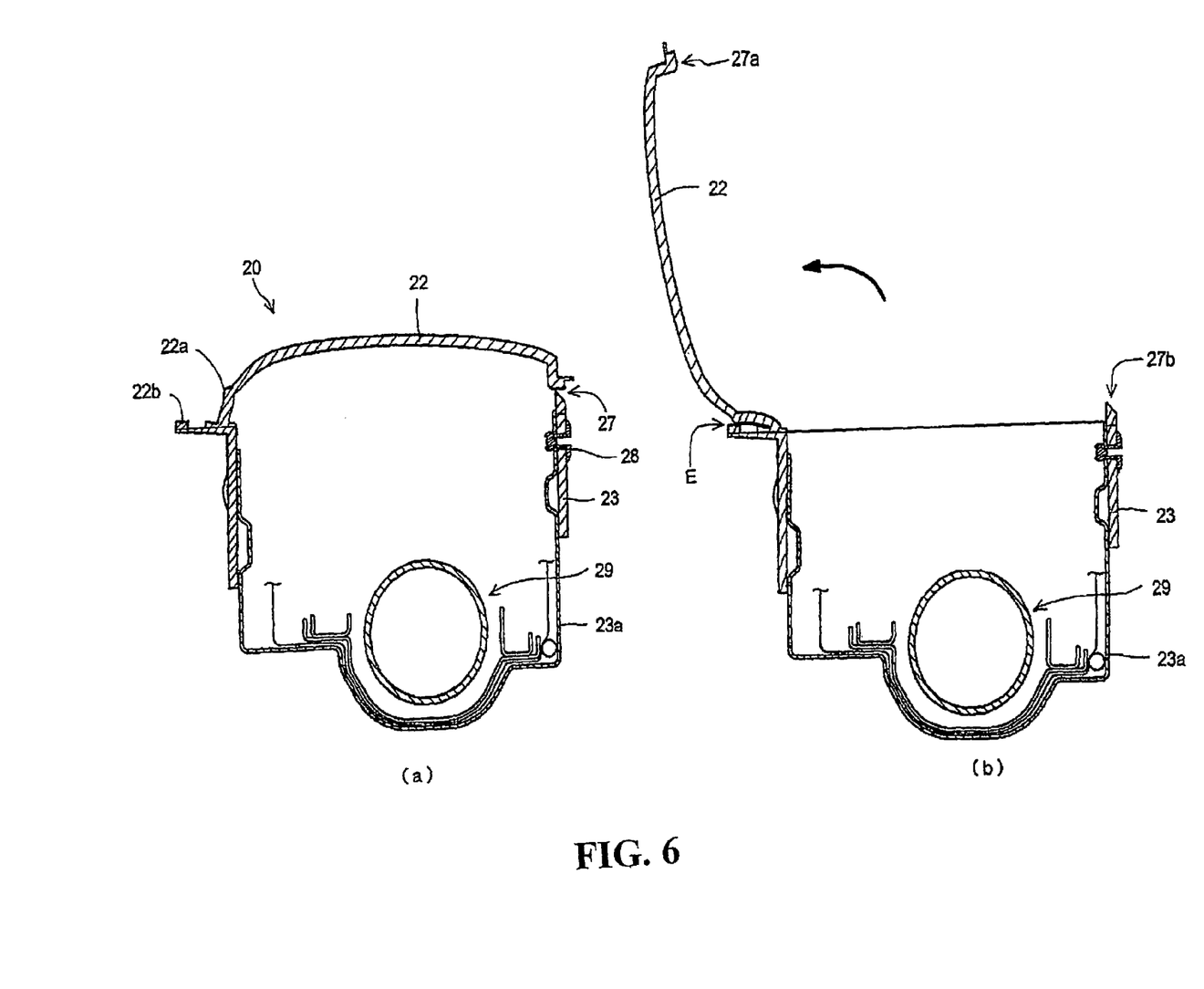
FIGS. 6(a) and 6(b) show sectional views of an air bag module according to one embodiment of the present invention.

FIGS. 6(a) and 6(b) are sectional views along line A-A of FIG. 5(b), in which FIG. 6(a) shows the condition at normal time (e.g., when the air bag is not inflated), and FIG. 6(b) shows the condition when the air bag 50 is inflated and developed. The same symbols as used above denote portions the same with or equivalent to the above-mentioned. In FIG. 6(a), the inflator 29 for generating a gas for inflating and developing the air bag 50 is contained in the vicinity of a bottom portion of the lower-side casing 23a. The first tear lines 27 are each formed by imparting brittleness through molding in a small material thickness a boundary portion between the module cover 22 and the casing 23. Besides, at upper portions of the surface on the vehicle front side of the air bag module 20, projected stoppers 22a and 22b are formed over the whole width in the vehicle width direction.

At the time of inflation and development of the air bag 50 as shown in FIG. 6(b), the gas generated by the inflator 29 is instantaneously supplied into the air bag 50 stored in its folded position, and, due to the pressure of the gas, the module cover 22 is pushed up from the inside. By the pushing force or pressure, the second tear line 27 is ruptured while forming rupture surfaces 27a and 27b, which permits the air bag 50 to be inflated and developed to the upper side. In this instance, as a characteristic configuration in this embodiment, the stoppers 22a and 22b make contact with each other at portion E in the figure so as thereby to make it difficult for the module cover 22 to be opened further. According to this configuration, the module cover 22 can be developed to a predetermined angle.

As above-mentioned, according to the present invention, the tear lines as brittle portions are provided in the side surfaces of an upper portion of the air bag module, so that, for example, the toughness of the module cover surface against external factors can be enhanced. For example, even if a sticker is attached to the surface of the module cover or the surface is scratched, the inflation and development of the air bag will not be influenced in any way; therefore, an air bag module cover suitable for application to a motorcycle can be obtained. In addition, since it is unnecessary to provide the module cover surface with a tear line, the degree of freedom in designing the module cover surface can be enhanced.

Incidentally, the shape, structure, number, and the like of the tear lines are not limited to those in the above-described embodiments, and can be modified variously. Also, the air bag module cover structure according to the present invention can naturally be applied to other vehicles than motorcycles.

We claim:

1. An air bag module cover structure applied to a substantially rectangular parallelepiped-shaped air bag module, said air bag module cover comprising:
   four side surfaces, including a vehicle front side surface, a vehicle rear side surface, and two opposing vehicle width side surfaces,
   wherein three of said four side surfaces, other than the vehicle front side surface, have tear lines at upper portions thereof,
   wherein the vehicle rear side surface is formed with a slit portion through which a support belt connects an air bag to a body of the vehicle,
   wherein upon activation of said air bag, said air bag module cover is displaced toward the vehicle front side through rupture of said tear lines, and
   wherein a stopper comprising a first stopper portion and a second stopper portion is provided on the side surface facing a vehicle front side of said air bag module cover, and
   the first stopper portion contacts the second stopper portion so as to make it difficult for said air bag module cover to be opened further,
   wherein said vehicle is a motorcycle.

* * * * *